United States Patent [19]

Iijima

[11] 4,186,638

[45] Feb. 5, 1980

[54] KEYBOARD DEVICE FOR AN ELECTRONIC MUSICAL INSTRUMENT

[75] Inventor: Masakatu Iijima, Hamamatsu, Japan

[73] Assignee: Nippon Gakki Seizo Kabushiki Kaisha, Hamamatsu, Japan

[21] Appl. No.: 913,840

[22] Filed: Jun. 8, 1978

[30] Foreign Application Priority Data

Jun. 16, 1977 [JP] Japan ............................ 52-78790[U]

[51] Int. Cl.[2] ............................................ G01H 1/00

[52] U.S. Cl. ................................ 84/1.01; 84/DIG. 7; 200/5 A; 340/365 R; 340/365 S

[58] Field of Search .......................... 84/1.01, DIG. 7; 200/5 A, 159 B; 340/365 R, 365 S

[56] References Cited

U.S. PATENT DOCUMENTS

| | | | |
|---|---|---|---|
| 3,735,012 | 5/1973 | Hirano | 84/1.01 |
| 3,932,722 | 1/1976 | Obata et al. | 200/159 B X |
| 3,965,789 | 6/1976 | Pearlman | 84/DIG. 7 |
| 4,079,651 | 3/1978 | Matsui | 84/DIG. 7 |
| 4,111,091 | 9/1978 | Hinago | 84/1.01 |
| 4,117,279 | 9/1978 | Schoemer | 200/5 A |

*Primary Examiner*—S. J. Witkowski

*Attorney, Agent, or Firm*—Spensley, Horn, Jubas & Lubitz

[57] ABSTRACT

A keyboard device for an electronic musical instrument made according to the applicant's invention comprises a printed circuit board formed with pairs of stationary contacts corresponding to respective keys and a common movable contact member made of elastic rubber and disposed over the circuit board for connecting each pair stationary contacts. The common movable contact member is used for plural pairs of stationary contacts and on-off condition of each key switch is detected in time division. The movable contact member is simply placed in position on the printed substrate and holding members are provided on a keyboard frame for restricting lateral expansion of the movable contact member which takes place when the movable contact member is brought into contact with the stationary contacts by depression of the keys.

6 Claims, 5 Drawing Figures

KEYBOARD DEVICE FOR AN ELECTRONIC MUSICAL INSTRUMENT

BACKGROUND AND SUMMARY OF THE INVENTION

This invention relates to a keyboard device for an electronic musical instrument, particularly to a key switch structure for use in a digital electronic musical instrument in which key on-off conditions of key switches are detected in a time division multiplex manner.

In prior art electronic musical instruments, a key switch is provided independently and separately for each of keys in the keyboard. This naturally requires a large number of key switch component parts and assembling processes, resulting in a complicated, bulky and costly keyboard construction. Particularly, mechanical type key switches using metal contacts require a large number of parts and it is difficult to make the keyboard structure compact. Further, metal contacts are frequently made of precious metals such as gold and silver for preventing deterioration but this is disadvantageous in respect of costs. Metal contacts are disadvantageous also in respect of easy occurrence of chattering.

In the prior art electronic musical instruments, a printed circuit board formed with stationary contacts is secured directly to a keyboard frame. This prior art structure of the keyboard however is disadvantageous in that the printed circuit board tends to be deformed or deflected due to change in temperature or like causes.

It is, therefore, an object of the present invention to provide a keyboard device which has eliminated the above described disadvantages of the prior art keyboards and is suitable for use in an electronic musical instrument employing digital techniques.

According to the invention, a movable contact member of a key switch is made of a single piece adapted for a common use for depression of plural keys. By employing this keyboard device, the number of required component parts is reduced and assembling of the instrument is simplified. Besides, the keyboard device according to the invention facilitates disposition of a movable contact member and prevents deformation or deflection of a printed circuit board formed with stationary contacts.

The invention will now be described with reference to the accompanying drawings.

BRIEF DESCRIPTION OF THE DRAWINGS

In the accompanying drawings.

DESCRIPTION OF THE PREFERRED EMBODIMENTS

Figure 1:
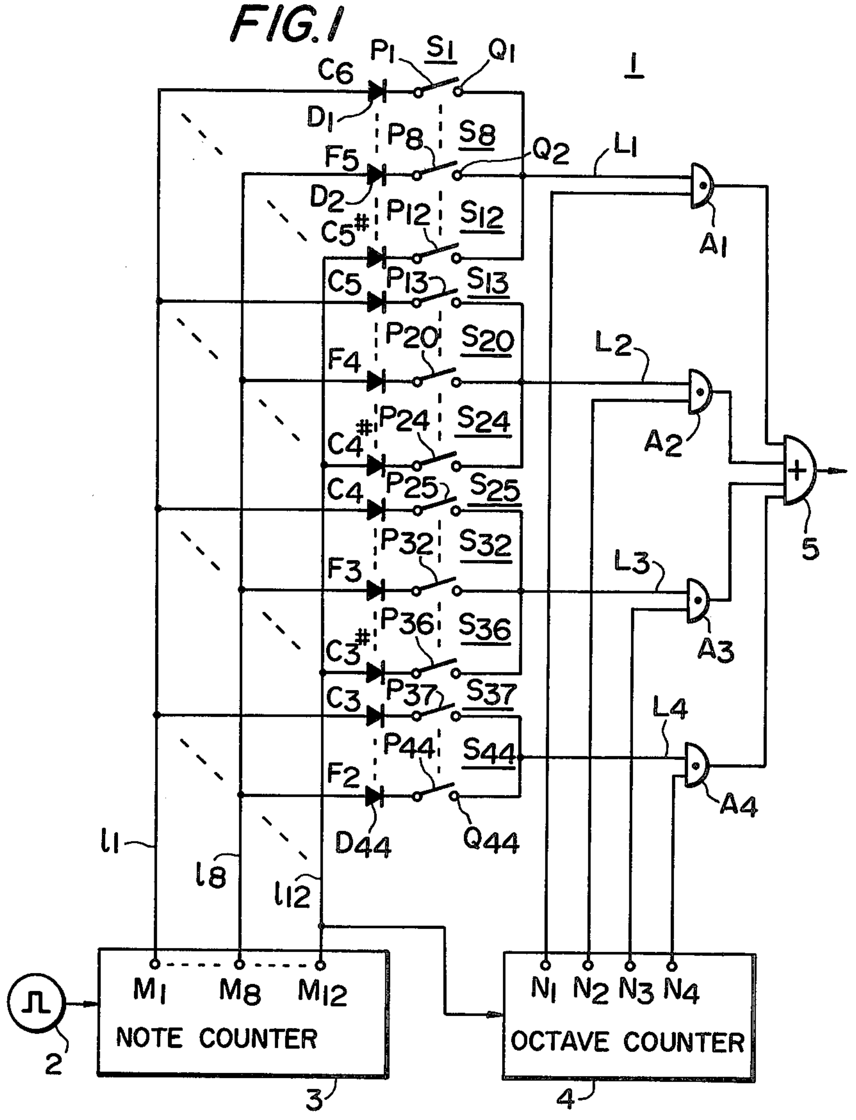
FIG. 1 is a schematic circuit diagram showing a key switch circuit to which the keyboard device according to the invention is applied.

FIG. 1 schematically shows an example of a key switch circuit to be incorporated in an electronic musical instrument employing a digital technique. A typical example of such a musical instrument has been disclosed in U.S. Pat. No. 3,610,799 issued on Oct. 5, 1971. This example of the key switch circuit is related to an electronic musical instrument having 44 keys ($C_6$–$F_2$). In the key switch circuit 1, on-off states of respective keys are detected by scanning operations by a note counter 3 and an octave counter 4. The note counter 3 consists, for example, of a ring counter of 12 stages which is driven in a stepping movement by clock pulses from a clock pulse source 2. A signal "1" is sequentially outputted from output terminal $M_1$–$M_{12}$ of the note counter 3 at a timing of the clock pulse.

The octave counter 4 is driven in a stepping movement by an output signal from the output terminal $M_{12}$ of a last bit in the note counter 3 to produce a signal "1" sequentially from output terminals $N_1$–$N_4$. Key switches $S_1$–$S_{44}$ correspond to respective keys $C_6$–$F_2$. Movable contacts $P_1$–$P_{44}$ of the key switches $S_1$–$S_{44}$ are commonly connected with respect to same note name in different octave by common connection line $l_1$–$l_{12}$. Stationary contacts $Q_1$–$Q_{44}$ of the key switches $S_1$–$S_{44}$ are commonly connected with respect to each group of notes $C_6$–$C_5\#$, $C_5$–$C_4\#$, $C_4$–$C_3\#$and $C_3$–$F_2$ by common connection lines $L_1$–$L_4$. Signals appearing on the lines $L_1$–$L_4$ are applied to one input of AND gates $A_1$–$A_4$ which receive the outputs of the octave counter 4 at another input thereof. The outputs of the AND gates $A_1$–$A_4$ are gated out of an OR gate 5.

In the key switch circuit 1 of the above described construction, all of the key switches $S_1$–$S_{44}$ are scanned sequentially and periodically by the note counter 3 and the octave counter 4 and binary signals representative of on-off states of respective keys are successively outputted from the output terminal of the OR gate 5. Accordingly, depression or non-depression of each key can be detected by presence or absence of a signal "1" in a time slot corresponding to the key.

Figure 2:
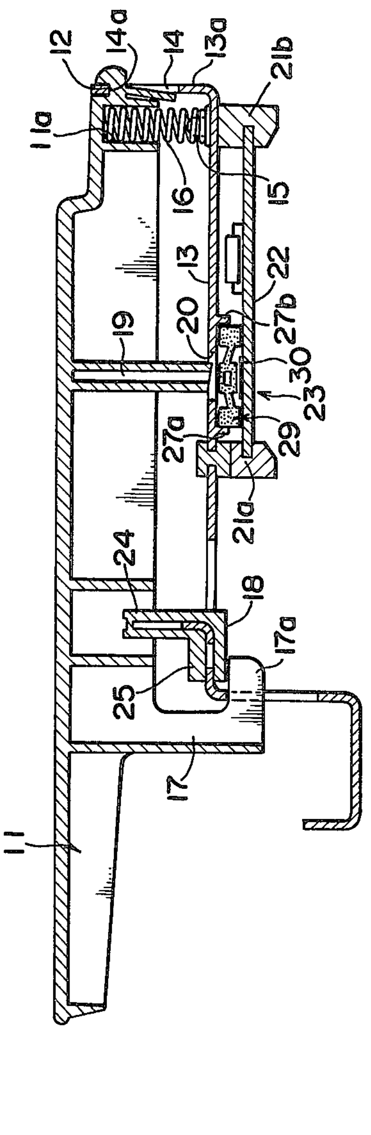
FIG. 2 is a vertical sectional view of an embodiment of the keyboard device according to the invention.

An example of the keyboard device according to the invention is shown in vertical section in FIG. 2. A key 11 is formed with a transversely extending groove 12 at the upper rear portion thereof. An upper edge portion 14*a* of an opening 14 formed in a vertical rear end portion 13*a* of a keyboard frame 13 is engaged in the groove 12 thereby forming a pivoting point of the key 11. A helical spring 16 is provided between a spring support 15 provided in the vicinity of the rear end portion 13*a* and a recess 11*a* formed in the rear portion of the key 11. This spring 16 imparts a clockwise rotating force to the key 11 as viewed in FIG. 2. A hook portion 17 is formed in the front portion of the key 11 and a horizontal leg 17*a* of the hook portion 17 is in abutting engagement with the lower surface of a buffer 18 which is secured on the front end portion of the keyboard frame 13 and serves as a stopper defining an upper limit of the vertical movement of the key 11.

A printed circuit board 22 is provided under the keyboard frame 13, being supported between supports 21*a* and 21*b* secured on the lower surface of the keyboard frame 13. The circuit board 22 is supported at its front and rear end portions by the supports 21*a* and 21*b* for preventing deformation or deflection of the board 22. In the prior art keyboard device, a printed circuit board was secured directly to the keyboard frame so that the board was deformed or deflected due to stretching thereof caused by change in temperature or the like. According to the present embodiment, the board 22 is slidably fitted in recesses formed in the supports 21a and 21b without being fixedly secured to the supports 21a and 21b so that the board can be stretched without causing deflection or deformation. The circuit board 22 need not necessarily be supported by two supporting members as in the present embodiment but may be supported by one supporting member or more than two supporting members.

A key switch 23 is provided on the circuit board 22. The key switch 23 comprises, as will be described more in detail with reference to FIG. 3, a plurality of stationary contacts 30 printed or suitably formed on the circuit board and a movable contact member 29 which is held between holding portions 27a and 27b projecting downwardly from the keyboard frame 13 and is disposed over the stationary contacts 30. When the key 11 is depressed, an actuator 19 formed integrally with the key 11 and projecting downwardly therefrom is displaced downwardly through an aperture 20 formed in the keyboard frame 13 to depress the movable contact member 29. The key 11 is guided along the key guide 24 and the downward displacement of the key is restricted by the buffer 25 which constitutes the lower limit stopper.

The holding portions 27a and 27b facilitate disposition of the movable contact member 29 and prevents horizontal expansion of the movable contact member 29 during depression of the movable contact member 29 by the key thereby ensuring a precise operation of the key switch 23.

Figure 3:
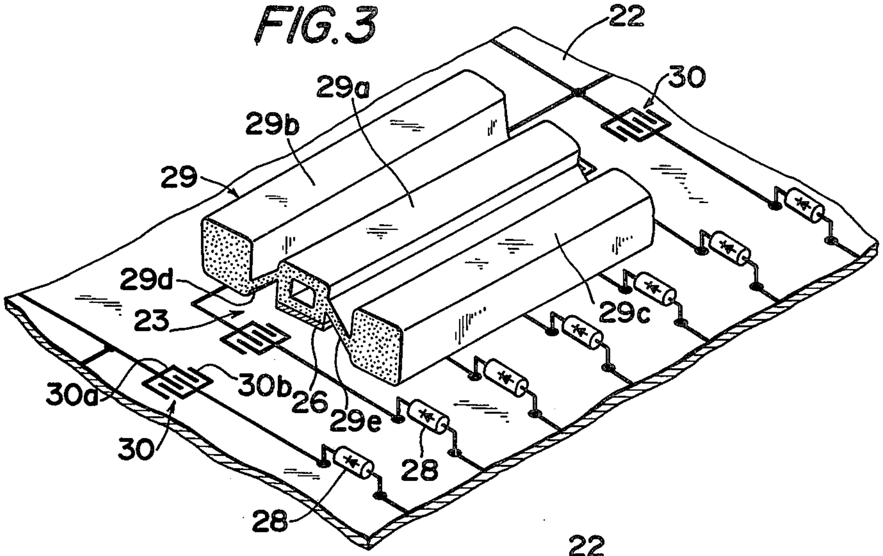
FIG. 3 is a fragmentary perspective view showing an essential portion of the keyboard device in an enlarged scale and partly in section.

The key switch 23 comprises, as shown in FIGS. 3, the stationary contacts 30 formed on the board 22 and the movable contact member 29 disposed above the stationary contacts 30 and extending over the entire range of keys for notes $C_6$–$F_2$. The movable contact member 29 comprises an elongated and hollow movable portion 29a, elongated stationary portions 29b and 29c arranged on both sides of the movable portion 29a and extending in parallel to the movable portion 29a and flexible and diagonal supporting portions 29d and 29e connecting the movable portion 29a with the stationary portions 29b and 29c. The movable contact member 29 is made of an insulating elastic material. A movable contact plate 26 consisting of an electrically conductive material such as a conductive rubber is bonded to the bottom of the movable portion 29a. The movable contact plate 26 is divided for respective octaves, each divided plate covering each octave. The movable contact member 29 is disposed in a position where the movable portion 29a is depressed by the actuator 11 of the key 11 when the actuator 11 is pressed down and in such a manner that the movable contact plate 26 is slightly spaced away from the supper surface of the board 22 when the actuator 19 is not pressed down.

The stationary contacts 30 are formed in positions corresponding to the respective actuators 19 of the keys for the notes $C_6$–$F_2$ on the upper surface of the board 22. Each pair of the stationary contacts consists of a pair of comb-shaped electrodes 30a and 30b which are formed closely opposite to each other. The electrodes 30a are connected commonly with one another with respect to each octave whereas the electrodes 30b are connected commonly with one another through diodes 28 with respect to each note.

In the state shown in FIG. 2 in which the key 11 is not being depressed, the key 11 is maintained in a horizontal position with the leg 17a of the hook portion 17 being in abutting engagement with the buffer 18. In this state, the actuator 19 is above the upper surface of the movable portion 29a of the movable contact member 29. Accordingly, the movable contact plate 26 is spaced away from the stationary contacts 30 whereby the key switch 23 is in an off state.

As the key 11 is depressed, the key 11 is rotated counterclockwise as viewed in the figure about the upper edge portion 14a of the opening 14 of the keyboard frame 13 causing the actuator 19 to depress the movable portion 29a of the movable contact member 29. The supporting portions 29d and 29e are bent by the downward force applied to the movable portion 29a and the movable portion 29a is displaced downwardly with resulting contact of the movable contact plate 26 with the stationary contacts 30. Thus, the electrodes 30a and 30b of the stationary contacts 30 are connected.

As the key 11 is pressed further down, the movable portion 29a is deformed because it is hollow whereby the pressing force of the key 11 is absorbed. This absorption of the pressing force of the key 11 serves to mitigate an excessive force applied to the key switch 23 and also to provide a slight extra stroke of the key 11 which is necessary for a smooth key operation during the musical performance.

As the key 11 is released from the depressed state, the key 11 is rotated clockwise due to the force of the spring 16 and returns to the horizontal position as shown in FIG. 2. The actuator 19 moves upwardly and the movable portion 29a and the supporting portion 29d and 29e of the movable contact member 29 return to the original position. The movable contact plate 26 is brought out of engagement with the stationary contacts 30 and the electrodes 30a and 30b are opened.

If the keyboard device according to the invention is applied to the key switch circuit shown in FIG. 1, the one-off states of the respective keys are detected in a time division manner no matter how many keys have been depressed within the same octave or no matter how many keys of the same note have been depressed. It will be apparent from the foregoing description that the number of component parts of the keyboard can be reduced and assembling of the keyboard can be simplified for the movable contact member which is common to a plurality of keys is employed. The movable contact member is formed as a single piece so that it can be easily manufactured by an extrusion molding. Further, according to the invention, disposition of the movable contact member can be facilitated and an accurate operation of the key switch can be ensured. Futhermore, the keyboard can be made compact, an accurate contact of the movable contact member with the stationary contact members can be achieved and chattering can be effectively prevented.

Figure 4:
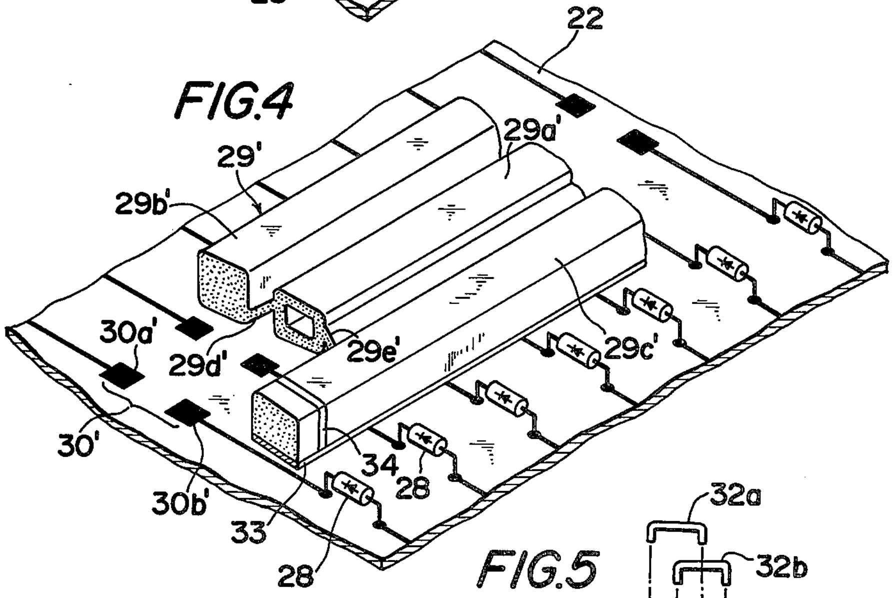
FIG. 4 is a fragmentary perspective view showing another example of an essential portion of the keyboard device in an enlarged form and partly in section.

FIG. 4 shows another embodiment of the keyboard device according to the invention. In this embodiment, movable portion 29a' stationary portions 29b' and 29c' and supporting portions 29d' and 29e' of a movable contact member 29 are all made of a conductive rubber, an insulating material 33 is bonded to the bottom of the stationary portion 29c' disposed on the side of electrodes 30b' of stationary contacts 30' which are connected to diodes 28. The stationary portion 29b' is directly disposed on electrodes 30a' of the stationary contacts 30' and the whole movable contact member 29' is separated by an insulating material 34 or simply cut octave by octave. According to this construction, the same function and result as those of the previously described embodiment can be obtained. In this embodiment, the electrodes 30*b*′ only need to be placed under the movable portion 29*a*′ so that construction of the stationary contacts 30*a*′ and 30*b*′ may be formed in a simple shape as shown in FIG. 4.

Figure 5:
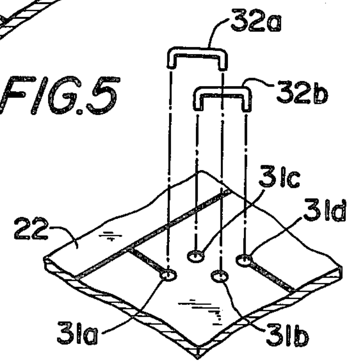
FIG. 5 is an enlarged perspective view of another example of a stationary contact employed in the keyboard device.

In the above described embodiments, the electrodes of the stationary contacts are made in the form of a conductive pattern. The form of the stationary contacts however is not limited to this but the stationary contacts may be formed by inserting metal wires 32*a* and 32*b* into apertures 31*a*, 31*b*, 31*c* and 31*d* formed in the printed circuit board 22 as shown in FIG. 5.

In the above described embodiments, the conductive rubber used in the movable contact member is divided on the octave basis. This is an arrangement made for applying the keyboard device according to the invention to the key switch circuit as shown in FIG. 1. The conductive rubber may be divided or connected suitably according to construction of a key switch circuit.

In the above described embodiments, the printed circuit board carrying the key switches and the supporting members for the printed substrate are provided under the keyboard frame. They may, however, be provided above the keyboard frame. In the latter case, the supporting members for the printed circuit board should be provided above the keyboard frame such that they penetrate through the board.

What I claim is:

1. A keyboard device for an electronic musical instrument, comprising:

a set of keys, a corresponding set of switches each associated with a respective key, each switch having a stationary contact, a movable contact that is common to a plurality of keys corresponding to the notes of one octave, depression of any one or more keys in said one octave causing a corresponding portion or portions of said common movable contact to complete an electrical circuit with the corresponding one or more stationary switch contacts, and note scanning circuitry for providing signals in time sequential order to said stationary switch contacts, so that upon depression of one or more of said plurality of keys, signals in time slots corresponding to the respective note names of the depressed keys are outputted through said common movable contact.

2. A keyboard device according to claim 1 wherein said set of keys encompasses more than one octave, there being several like movable contacts each associated with all of the notes in a respective different octave, said note scanning circuitry providing said time sequential signals in parallel to all of the stationary switch contacts corresponding to like note name keys in each octave, said device further comprising:

octave scanning circuitry, connected to and advanced by said note scanning circuitry, for sequentially connecting the outputs of said common movable contacts to an output terminal, so that there is produced at said output terminal a time division multiplex signal in which the levels at respective time slots represent on-off states of the respective keys of said keyboard.

3. A keyboard device for an electronic musical instrument, comprising:

a plurality of keys movably mounted on a frame;

a circuit board located in a fixed relation relative to said frame and having multiple pairs of stationary contacts, each pair being designated to and situated beneath a corresponding key of said keyboard; and an elongated movable contact member made of elastic material and including:

a pair of elongated base sections supported on said circuit board and spaced from each other and arranged with their longitudinal axes in a direction of a row of said keys;

a movable section of elongated configuration interposed between said base portions; and a pair of elongated flexible web sections respectively interconnecting opposite longitudinal sides of said movable section to said base sections to elastically support the movable section in spaced apart relationship with said stationary contacts, said web sections having a thickness smaller than those of the movable section and the base sections, said movable section including an electrically conductive portion which extends over plural separate stationary contacts corresponding to selected plural keys to serve as a movable contact common to said selected keys and which is depressible upon actuation of any designated key among said selected keys for interconnection of the pair of the stationary contacts corresponding only to said designated key.

4. A device according to claim 3, in which the movable section of said movable contact member has a hollow structure to absorb depressive force of the key after the interconnection of the stationary contacts.

5. A device according to claim 3 or 4, in which the movable contact of said movable contact member is common to the stationary contacts designated to the keys in one octave.

6. A keyboard device for an electronic musical instrument as defined in claim 3 which further comprises:

a printed circuit board supporting member provided on said frame and holding at least one side edge portion of said circuit board in parallel to and spaced away from the frame; and movable contact member holding portions provided on said frame for preventing horizontal expansion of said movable contact member during depression of said movable section by said designated key.

* * * * *